Aug. 29, 1967          G. FREEMAN          3,338,028
SPIRAL SELF-ADHERING TYPE RACE HORSE BANDAGE
Filed Sept. 8, 1965
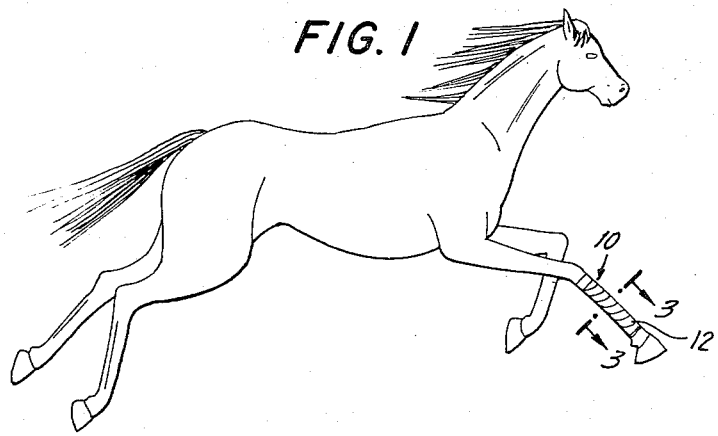
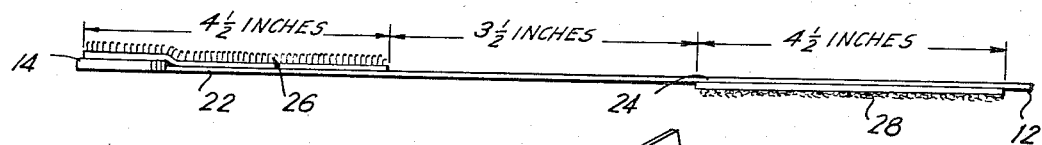
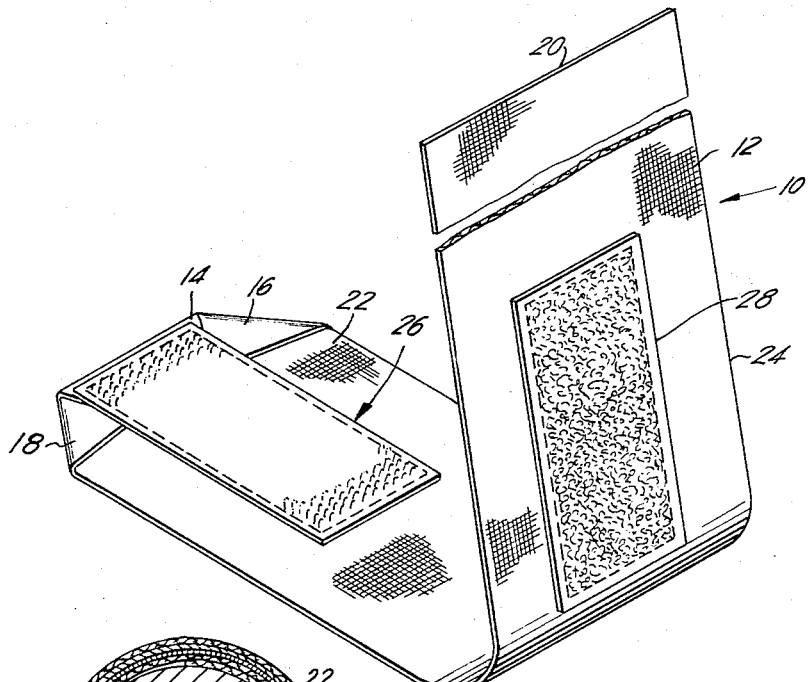
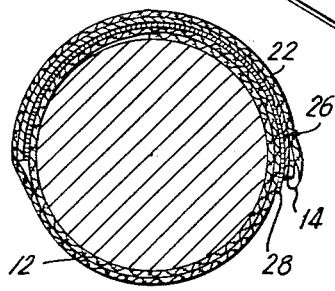
INVENTOR
GILBERT FREEMAN
BY *Amster & Rothstein*
ATTORNEYS

United States Patent Office 3,338,028
Patented Aug. 29, 1967

3,338,028
SPIRAL SELF-ADHERING TYPE RACE HORSE BANDAGE
Gilbert Freeman, West Newton, Mass., assignor to Gilbert Freeman, Inc.
Filed Sept. 8, 1965, Ser. No. 485,775
5 Claims. (Cl. 54—82)

The present invention relates generally to equipment for race horses and specifically to a track bandage for the lower legs of race horses.

It has become generally accepted practice in the training of race horses to bandage their delicate lower legs with a soft, cushioned bandage. This expedient has materially reduced minor accidents such as abrasions as well as major mishaps such as fractures. The importance of this protective measure is not merely restricted to humanitarian consideration; the high cost and high risk characteristics of horse racing dictates the exercise of maximum caution in the protection of the significant investment represented by each race horse.

While a degree of success was obtained by prior art track bandages, the heretofore known devices have not been completely accepted due to the difficulty in applying the same to the horses' legs and particularly due to the difficulties involved in obtaining bandages of the correct length and tightness and fasting same securely around the horses' legs. With the fastening elements provided in prior art bandages, if the length of the bandage was not perfect, if the diameter of the horse's leg was not just right, if the bandage was not wrapped with just the right amount of tension and if the fastening elements were not made properly and located in the proper position, the bandage could not be fastened properly. If any one or more of these factors did not work together in just the proper proportion, the bandage was difficult to secure and, in some cases, the bandage would come apart and fall off. Even in cases where it was possible to do a good job in the application of a bandage, the prior constructions were at best, difficult to apply. Therefore, there has been a need for a race horse bandage incorporating securement means which provide an improvement over the prior art.

Accordingly, it is an object of the present invention to provide a track bandage for race horses of improved functional characteristics. Specifically, it is an object of the present invention to provide a race horse bandage which is easy to secure no matter what the length of the bandage, the tightness of the bandage around the horse's leg or the diameter of the horse's leg.

More particularly, it is among the objects of the present invention to provide a track bandage which may be securely and simply fastened no matter what the diameter of the horse's leg to which the bandage is applied, the length of the bandage or the tightness with which the bandage is wound around the horse's leg.

In accordance with one illustrative embodiment of the present invention, there is provided a track bandage for use on the lower legs of a race horse which comprises an elongated length of knitted material. The bandage has an inner end and outer end and inside and outside faces. Releasable securement means are positioned adjacent to the outer end of the track bandage, on the inside and outside faces respectively, for securing the bandage in rolled configuration about the leg of a race horse with a total outside circumference varying between 4½ inches and 11½ inches. The releasable securement means comprises a strip of hook fastener material about 4 inches in length attached to the inside face of said bandage and extending from immediately adjacent the outer end toward the inner end as well as a complementary strip of pile material about 4 inches in length and attached to the outer face extending from approximately 8 inches from the outer end toward said other end.

The above brief description, as well as further objects, features and advantages of the present invention, will be best understood by reference to the following detailed description of one presently preferred embodiment when taken in conjunction with the accompanying drawings, wherein:

FIGURE 1 is an elevational view of a race horse showing a bandage in accordance with the present invention applied to the right foreleg;

FIGURE 2 is a view of the edge of an end portion of a bandage made in accordance with the present invention, illustrating the location of the securement means;

FIGURE 3 is a perspective view of a bandage manufactured in accordance with the present invention, with portions of the bandage broken away to reduce the length thereof for purposes of the present illustration; and FIGURE 4 is a sectional view, along the lines 3—3 of FIGURE 1 looking in the direction of the arrows diagrammatically and schematically illustrating the position of a coiled track bandage in accordance with the present invention wrapped around the lower leg of a race horse.

A track bandage in accordance with the present invention is illustrated in the drawings and is generally designated herein by the numeral 10. The bandage 10 is formed of an elongated strip of material 12 which is approximately 4¼ inches wide and approximately 9 feet long. It has been found that these dimensions provide a desirable length and bulk for the track bandages. At the outer end 14 of the bandage 10, the material 12 is folded over at the corners 16, 18 and secured by appropriate stitching. The other end or inner end 20 is free from any seams or hems and provides a smooth and soft start for the bandage 10 as it is wrapped around a horse's leg. The two faces of the bandage are, for convenience, denominated as the inner face 22 and the outer face 24 and refer generally to the directions in which the faces are aligned when the bandage is wrapped on a horse's leg.

The fastening means which are used to secure the bandage 10 comprise a hook fastener element 26 and a pile fastener element 28 secured to the inner face 22 and outer face 24 respectively. Specifically, the fastener elements 26, 28 are of the type generally illustrated in U.S. Patent No. 2,717,437 commercially marketed under the trademark Velcro. The hook member 26 consists of a plurality of plastic fibers arranged in a hooked configuration, while the pile member 28 basically consists of a pile of looped elements which are engaged by the hooked elements of the hook portion 26. When the elements are fastened together, they exhibit a great deal of strength in the shear direction, but can be taken apart when pulled normal to their surfaces since when pulled in that direction the fiber hooks are stressed one at a time to release their grip on the looped elements of the pile member 28. The hooked portion 26 of the fastening means is, in the present illustrative embodiment, approximately 2 inches wide and 4¼ inches long and extends from the outer end 14 along the center of the inner face 23 toward the inner end 20. The pile portion 28 of the fastening means is of approximately equal dimension and extends along the center line from a point 8 inches from the outer end along the outer face of the bandage 10 toward the inner end 20.

In use, the bandage 10 is wrapped in a spiral configuration about the leg of a race horse starting with the inner end 20 and with the inside face 22 toward the horse's leg. Since the knitted material 12 which forms the bandage 10 is flexible and resilient, the bandage may be wound with any desired degree of tightness. The location of the final overlap of the bandage, i.e. the location of the outer end 14 of the bandage over the immediately preceding spiral loop, is dependent upon the degree of tightness with which the bandage is wound, the length of the bandage 10 and the diameter of the horse's leg. As will be explained in detail below, the placement of the fastening elements 26 and 28 on the bandage 10 is such that the bandage may be securely fastened regardless of the variation in length, tightness and diameter of the bandage.

Since only about ½ inch of overlap is necessary in order to secure the Velcro members 26 and 28 to each other, the outer circumference of the wound bandage 10 may be, in the configuration illustrated herein, as great as 12 inches. The 12 inch diameter comprises ½ inch less than the amount of bandage from the outer end 14 to the innermost end of the pile fastener element 28 with the ½ inch amount being subtracted to provide the required overlapping securement zone. Similarly, a bandage with an outside circumference of as little as 4½ inches may also be made from the illustrated device; however, it is doubtful that a bandage of such small proportions would ever be used. Furthermore, in such circumstances, there would have to be a large amount of the hook portion 26 of the fastening means flapping free—a relatively undesirable result. In practice, it is preferable that the outer end 14 of the bandage 10 be located at a point wherein the hooks of the hook element 26 immediately adjacent the outer end are engaged with at least a portion of the pile strip 28. This would occur in the bandage illustrated herein with a finished bandage being no smaller than 8½ inches in outer circumference. It has been found that the normal range for such bandages is between 8½ inches and 12 inches in circumference and hence the construction illustrated here are well within the proper range. Of course, if the pile element 28 of the Velcro fastening means were continued further toward the outer end 14 of the bandage 10, a small diameter bandage could be formed free from any disadvantages associated with a flapping free end. Similarly, larger diameter bandages may be made simply by extending the pile portion 28 of the Velcro fastener further toward the inner end 20 of the bandage. It is believed that the advantages of the fastening means on a track bandage in accordance with the present invention are realized to their maximum when the pile portion 28 extends up to about 6 inches from the outer end 14 in one direction and extends about 15½ inches from the outer end 14 in the other direction. With this construction bandages of optimum performance can be formed with outer circumferences varying from a minimum of 6 inches (with the smallest circumference as possible where it is permissible for the outer end to flap free for some extent) to a maximum circumference of 15 inches. The illustration of FIGURE 2 shows one possible configuration.

The construction of the race horse bandage in accordance with the present invention will be best appreciated by considering the following recitation of how the bandage is applied to the lower leg of a race horse. The inner end 20 is laid against the side of the leg with the inner face 22 in contact with the horse's leg. The bandage is then wound around the horse's leg. Ordinarily, the bandage would be somewhat spiralled to cover the whole of the lower leg of the horse. Of course, the trainer applying the bandage would carefully maintain at least one portion of each spiral loop in an overlapping relation with the previously applied loop thereby to assure a continuous contact between all portions of the bandage. The last loop of the bandage is applied with somewhat greater tension thereby to provide a firm securement of the bandage on the leg. The hook portion 16 of the Valcro fastening means is placed against the pile portion 28 and lightly pressed with a normal force to engage the Velcro fastening means. It will be appreciated that it makes absolutely no difference in the fastening of the bandage 10 as to exactly how large in diameter the bandage turns out to be, how tightly it is wound about the horse's leg or at what location along the length of the horse's leg fastening is accomplished. There are no requirements for tying strings on a horse which may not be very cooperative in maintaining a rigid position at a location which could be and often is dangerous. Nor is there a requirement for accurately locating snaps or buttons, nor is there any requirement for applying separate clamps or hooks not engaged directly on the bandage.

It will be appreciated that in accordance with the present invention there is provided a race horse track bandage of improved design and specifically one which incorporates securement means in an advantageous relationship to the geometry of the bandage such that it may be easily and securely applied to a race horse with a minimum of trouble and a maximum of adaptability.

The concept of the present invention may be incorporated in race track bandages which differ in minor respects from that specifically illustrated in the drawings herein. Accordingly, the claims which follow should be interpreted in a manner consistent with the spirit and scope of the invention.

What I claim is:

1. A track bandage for spiralled application to the lower leg of a race horse comprising an elongated strip of knitted fabric and fastening means, said fabric strip having inner and outer ends and inside and outside faces, said fastening means comprising a single Velcro hook portion and a single Velcro pile portion, both of said portions being located adjacent the outer end of the strip and both of said portions being elongated lengthwise of the strip, one of said portions being secured to the inner face of said fabric strip at said outer end and extending along the center of said fabric strip toward said inner end, the other one of said portions being secured to the outer face of said fabric strip and extending along the center of said fabric strip from a point spaced from said outer end a distance approximately equal to the circumference of said bandage when spirally wrapped about a horse's leg toward said inner end, the Velcro portions being adapted to overlap to an adjustable extent to variably determine the circumference of the outermost loop of the bandage.

2. A track bandage according to claim 1 wherein the Velcro hook portion is secured to the inner face of the fabric strip at the outer end thereof and the Velcro pile portion is secured to the outer end of the fabric strip portion spaced from the hook portion.

3. A track bandage according to claim 2 wherein the Velcro hook portion extends for at least four inches along the center of said fabric strip, the Velcro pile portion commencing about eight inches from said outer end.

4. A track bandage according to claim 2 wherein said hook portion extends for up to six inches along the center of said fabric strip toward said inner end, and wherein said pile portion terminates at a distance of approximately fifteen inches from said outer end.

5. A track bandage according to claim 2 wherein said bandage is at least six feet in length and wherein said pile portion extends from eight inches longitudinally of said bandage.

References Cited

UNITED STATES PATENTS

| | | | |
|---|---|---|---|
| 2,246,100 | 6/1941 | Marzani | 54—82 |
| 2,687,723 | 8/1954 | Stern | 128—169 |
| 3,054,400 | 9/1962 | Lizio | 128—163 |
| 3,086,529 | 4/1963 | Munz et al. | 128—327 |
| 3,209,517 | 10/1965 | Hyman | 54—82 |
| 3,255,749 | 6/1966 | Smithers | 128—169 |

FOREIGN PATENTS 1,263,391   5/1961   France.

ALDRICH F. MEDBERY, *Primary Examiner.*

SAMUEL KOREN, *Examiner.*